United States Patent Office 2,917,522
Patented Dec. 15, 1959

2,917,522

PROCESS FOR THE PRODUCTION OF ALKALI METAL ESTRONE SULFATE SALTS

William H. Price, Detroit, Mich., assignor to Parke, Davis & Company, Detroit, Mich., a corporation of Michigan No Drawing. Application October 10, 1957
Serial No. 689,257

5 Claims. (Cl. 260—397.4)

This invention relates to the production of crystalline hormones, in particular, crystalline alkali metal estrone sulfate compounds.

Heretofore, it has been proposed to obtain estrone salts by reacting estrone with a tertiary amine-sulfur trioxide adduct to form a tertiary amine salt of estrone sulfate, decomposing the latter salt with caustic solution and working up the resultant alkali metal estrone sulfate salt from the reaction mixture. This method suffers from several disadvantages in the preparation and use of the sulfur trioxide adduct required. One disadvantage is that liquid sulfur trioxide is an offensive substance and is difficult to handle, particularly on a commercial scale. A further disadvantage is that the sulfur-trioxide adduct must be absolutely pure for practical operation of the process. Moreover, traces of acid or moisture in the adduct have an adverse effect on the reaction. Consequently, unless special precautions are taken, the yield of the desired product is unsatisfactory.

It is therefore an object of the present invention to provide a convenient method for the production of alkali metal estrone sulfate salts in crystalline form and in good yield, which avoids the aforementioned disadvantages.

I have found that this object and other objects and advantages are realized if estrone is reacted with at least one molar equivalent of sulfamic acid in the presence of pyridine, the resultant reaction product is neutralized with alkali metal hydroxide and the product of neutralization is isolated from the aqueous mixture, thereby obtaining the desired crystalline alkali metal estrone sulfate compounds in good yield. In carrying out the process, the estrone, sulfamic acid and pyridine are suitably mixed together at elevated temperature, preferably between 70 to 105° C. The mixture is held at elevated temperature for a sufficient period of time, usually about one to two hours, to provide substantial completion of the reaction. The resulting reaction product which forms as a bulky crystalline precipitate is conveniently separated by conventional methods as by filtration, removal of solvent, etc. and neutralized in a suitable organic solvent preferably pyridine or alcohol, with a solution of an alkali metal hydroxide such as sodium hydroxide or potassium hydroxide. In order to avoid undesirable decomposition the temperature during neutralization is preferably maintained at room temperature or lower temperature. Preferably, pyridine is employed as a solvent for the neutralization. The resulting alkali metal salt of estrone sulfate can be conveniently isolated by separating the organic phase, adding to the organic phase an excess of organic solvent in which the salt is insoluble, such as diethyl ether, di-isopropyl ether, etc. and recovering the precipitated salt by filtration. Purification of the product, if necessary, is readily accomplished by recrystallization from a suitable solvent such as methanol, ethanol, etc.

A significant feature of the process is that no special precaution need be taken to exclude moisture from the reaction with estrone.

The invention is illustrated by the following examples.

*Example 1*

Sulfamic acid (291 g.) is added to a solution of 270 g. of estrone in 1080 ml. of pyridine and the mixture stirred vigorously at steam bath temperature for two hours. The reaction mixture is cooled to about 10° C., filtered and the filter cake washed with acetone and dried at a temperature below 100° C.

The dried reaction product is dissolved in a minimum quantity of pyridine and mixed with two volumes of 12% aqueous potassium hydroxide solution. The organic phase is separated and diluted with 3 to 5 volumes of ether. The resulting precipitate consisting of potassium estrone sulfate is filtered off, washed thoroughly with ether and dried at room temperature.

*Example 2*

A mixture of 5 g. of estrone, 5.4 g. of sulfamic acid and 20 ml. of pyridine is heated with stirring over a steam bath for 1½ hours. The reaction mixture is allowed to cool to room temperature and is poured into an equal volume of diisopropyl ether. After standing for 15 minutes, the mixture is filtered and the filter cake washed with ether and dried in vacuo.

3.5 grams of the dried reaction product is suspended in 15 ml. of methanol, and 13.1 ml. of a solution of 12% potassium hydroxide in methanol is added. The mixture is filtered and the filter cake, consisting of potassium estrone sulfate, is washed with methanol and dried at 60° C. in vacuo. A second crop of the desired product is obtained by adding di-isopropyl ether to the combined filtrate and washings and isolating and drying the resulting precipitate.

*Example 3*

Pyridine (140 ml.) is heated on a steam bath to 90° C. and a mixture of 35 g. of estrone and 37.8 g. of sulfamic acid is added, followed by stirring and continued heating for 1½ hours. The reaction mixture is cooled to room temperature, diluted with 500 ml. of diethyl ether and the resulting precipitate filtered off and dried under vacuum; yield, 81.45 g.

The dried product is added to a mixture of 580 ml. of aqueous 12% potassium hydroxide and 290 ml. of pyridine, and after thorough mixing, the organic phase is separated and diluted with two liters of ether. The supernatant is decanted and the residual crystalline sludge washed successively with three one-liter portions of ether. The sludge remaining after decantation of ether is stirred with four liters of methanol for one hour at room temperature and is then filtered. The filter cake, dissolved in four liters of methanol, and the filtrate are separately charcoaled, filtered and taken to dryness under vacuum; total yield of the desired potassium estrone sulfate, 36.07 g.

For the production of sodium estrone sulfate, the foregoing procedure of Example 3 is followed with the exception that the potassium hydroxide is replaced with an equivalent quantity of sodium hydroxide.

What is claimed is:

1. Process for the production of alkali metal estrone sulfate salts which comprises reacting estrone with at least one molar equivalent of sulfamic acid in the presence of pyridine at elevated temperature between 70° and 105° C., separating the estrone-3-sulfuric acid salt obtained, neutralizing said salt with alkali metal hydroxide, and recovering the resultant alkali metal estrone sulfate from the reaction mixture.

2. Process according to claim 1 wherein neutralization is accomplished in the presence of pyridine at room temperature.

3. Process according to claim 1 wherein the alkali metal hydroxide is potassium hydroxide.

4. Process for the production of potassium estrone sulfate which comprises reacting estrone with at least one molar equivalent of sulfamic acid in the presence of pyridine at temperatures between 70 to 105° C., neutralizing the resultant estrone-3-sulfuric acid salt with potassium hydroxide in the presence of pyridine, and recovering potassium estrone sulfate from the neutralization mixture.

5. In a process for the production of a crystalline alkali metal estrone sulfate salt comprising forming a mixture of estrone with sulfamic acid in the presence of pyridine at elevated temperature thereby obtaining a crude estrone sulfate reaction product containing impurities, cooling the mixture to cause precipitation of said product, separating said product, and treating said product with aqueous alkali metal hydroxide solution thereby producing an alkali metal estrone sulfate salt, the improvement in said treating step which consists in forming a mixture of said separated crude estrone sulfate reaction product with aqueous alkali metal hydroxide solution and pyridine, causing said mixture to separate into an aqueous phase and an organic phase, separating said organic phase and isolating crystalline alkali metal estrone sulfate from said organic phase.

References Cited in the file of this patent
UNITED STATES PATENTS

| | | |
|---|---|---|
| 2,642,427 | Hasbrouck | June 16, 1953 |
| 2,636,042 | Salkin | Apr. 21, 1953 |
| 2,666,066 | Hasbrouck | Jan. 12, 1954 |